(12) United States Patent
Zacher

(10) Patent No.: US 11,165,267 B2
(45) Date of Patent: Nov. 2, 2021

(54) CELL MODULE AND METHOD FOR OPERATING THE CELL MODULE

(71) Applicant: Dr. Ing. h.c. F. Porsche Aktiengesellschaft, Stuttgart (DE)

(72) Inventor: Marcus Zacher, Sindelfingen (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 107 days.

(21) Appl. No.: 16/787,163

(22) Filed: Feb. 11, 2020

(65) Prior Publication Data

US 2020/0259349 A1 Aug. 13, 2020

(30) Foreign Application Priority Data

Feb. 11, 2019 (DE) ..................... 10 2019 103 277.6

(51) Int. Cl.
*H02J 7/00* (2006.01)
*H01M 10/48* (2006.01)
*H01M 10/42* (2006.01)

(52) U.S. Cl.
CPC ......... *H02J 7/0047* (2013.01); *H01M 10/425* (2013.01); *H01M 10/4207* (2013.01); *H01M 10/482* (2013.01); *H02J 7/0013* (2013.01); *H01M 2010/4271* (2013.01); *H01M 2220/20* (2013.01)

(58) Field of Classification Search
CPC .... H02J 7/0047; H02J 7/0013; H01M 10/482; H01M 2010/4271; H01M 10/4207; H01M 2220/20; H01M 10/425
USPC ......................................................... 320/116
See application file for complete search history.

(56) References Cited

U.S. PATENT DOCUMENTS 5,914,606 A * 6/1999 Becker-Irvin ......... H02J 7/0019
324/434
8,462,005 B2 * 6/2013 Kuroda et al. ........ H02J 7/0048
340/636.1

(Continued)

FOREIGN PATENT DOCUMENTS

DE       103 17 986      11/2004
DE    10 2012 010 711     3/2013
DE    10 2014 201 358     7/2015

OTHER PUBLICATIONS

German Examination Report dated Nov. 26, 2019.

*Primary Examiner* — Sun J Lin
(74) *Attorney, Agent, or Firm* — Gerald E. Hespos; Michael J. Porco; Matthew T. Hespos

(57) ABSTRACT

A cell module is provided for a traction battery of a vehicle. The cell module includes a plurality of cells arranged in a series circuit and also includes at least two cell monitoring circuits for identifying a voltage applied between two poles of each cell of the plurality of cells. Each cell monitoring circuit of the two cell monitoring circuits has first and second voltage supply connections. The first voltage supply connection is coupled to a positive pole of a first cell and the second voltage supply connection is coupled to a negative pole of a second cell. The cell module further includes a switching apparatus that selectively couples the first voltage supply connection of a first cell monitoring circuit and the second voltage supply connection of a second cell monitoring circuit to a respective one of two positive poles or to one of two negative poles of different cells.

11 Claims, 3 Drawing Sheets

(56) References Cited

U.S. PATENT DOCUMENTS

| | | | |
|---|---|---|---|
| 8,994,335 B2* | 3/2015 | Tagami et al. ........ | H02J 7/0024 |
| | | | 320/134 |
| 10,132,871 B2* | 11/2018 | Miura et al. ........... | G01R 15/22 |
| 2012/0306449 A1 | 12/2012 | Tagami et al. | |

* cited by examiner

CELL MODULE AND METHOD FOR OPERATING THE CELL MODULE

CROSS REFERENCE TO RELATED APPLICATION

This application claims priority under 35 USC 119 to German Patent Appl. No. 10 2019 103 277.6 filed on Feb. 11, 2019, the entire disclosure of which is incorporated herein by reference.

BACKGROUND

Field of the Invention

The invention relates to a (battery) cell module and to a method for operating the cell module, in particular as part of a corresponding battery.

Related Art

Cell modules that have a number of cells require cell monitoring to operate the cells always in the correct operating window, particularly when lithium ion cells are used. Integrated circuits have been developed specifically for monitoring the cell voltages and are used on controller printed circuit boards (cell monitoring controller, CMC) to monitor the cells. Such a specific integrated circuit also is referred to as an application-specific integrated circuit (ASIC), and the acronym ASIC is used in the following text.

An ASIC always has a specific number of measurement inputs and can therefore monitor only a specific number of cells. If the number of cells to be monitored in the cell module is greater than the number of measurement channels of the ASIC, a plurality of ASICs must be used to monitor the cells of the cell module. Ideally, the number of cells is distributed evenly on the ASIC. If for example an ASIC is configured to monitor six cells and if the cell module has ten cells, two ASICs are used, wherein each ASIC monitors five cells. To this end, the two poles of a cell can be coupled electrically to corresponding measurement inputs so that the cell voltage applied between the poles can be identified. Nevertheless, it may be that a cell module has an uneven number of cells or, due to the high number of cells, plural ASICs have to be used, with the result that not each ASIC is connected to the same number of cells for monitoring.

In order that an ASIC can correctly measure the cell voltage, the positive voltage supply connection of the ASIC, for example the Vcc connection, has to be connected to the positive pole of the first (or last) monitored cell and the negative voltage supply connection, for example the GND connection, has to be connected correspondingly to the negative pole of the last (or first) monitored cell. An ASIC in this case draws the necessary supply current from the cells to which it is connected. If an ASIC has a lower number of connected cells than another ASIC of the controller printed circuit board, the cells of the cell module that are connected to the ASIC with the lower number of cells are loaded to a greater extent. Thus, over the lifetime of the battery to some cells always are loaded to a somewhat greater extent than the other cells of the battery. This leads to a non-homogeneous aging behavior of the cells of the battery, which in turn greatly restricts the overall usable operating range, since in each case the cell that is aged to the greatest extent prescribes the usable operating window.

The object of the invention is providing a cell module and an associated operating method so that non-homogeneous aging of the cells can be prevented.

SUMMARY

According to the invention, a cell module is provided and can be used in a traction battery of a vehicle, for instance an electric vehicle. The cell module is understood to mean a subunit within a battery that has at least two (energy storage) cells that are connected electrically to one another for the duration of the operation of the cell module. Each cell can correspond for example to a galvanic secondary cell. The cell module includes plural cells that are arranged in a series circuit and at least two cell monitoring circuits for identifying a voltage (cell voltage) applied between the poles of cells. Each cell monitoring circuit has two voltage supply connections. A first voltage supply connection is coupled to a positive pole of a cell and a second voltage supply connection is coupled to a negative pole of a cell. Therefore, a cell monitoring circuit, which may correspond to an ASIC, draws its operating energy from the series circuit of cells between and including the cells to which the voltage supply connections thereof are coupled. The first voltage supply connection may be a positive pole and the second voltage supply connection may accordingly be a negative pole of the cell monitoring circuit.

The cell module according to the invention also includes a switching apparatus that is configured to selectively couple the first voltage supply connection of the first cell monitoring circuit and the second voltage supply connection of the second cell monitoring circuit to a respective one of two positive poles or to a respective one of two negative poles of different cells. Thus, the switching apparatus is configured to offset the position of the connection point of one of the voltage supply connections of at least two cell monitoring circuits in the series circuit of the cells. In this case, the position of the connection point of a voltage supply connection can be switched over from a position between two cells coupled to one another to a position between one of the cells and the cell adjacent thereto.

In accordance with further embodiments of the cell module, the switching apparatus can have a first switch and a second switch. Each of the switches can correspond to a single-pole toggle switch. The first switch can be coupled by way of the contacts thereof to the first voltage supply connection of a cell monitoring circuit and to two positive poles of two first cells. Thus, the first voltage supply connection can be coupled selectively to the positive pole of one of two first cells depending on the position of the first switch. In particular, the two first cells can be adjacent cells, namely cells coupled to one another with positive pole to negative pole. In the same manner, the second switch can correspond to a single-pole toggle switch and can be coupled by way of the contacts thereof to the second voltage supply connection of the second cell monitoring circuit and to two negative poles of two second cells. Thus, the second voltage supply connection can be coupled to the negative pole of one of the two second cells depending on the position of the second switch. The two second cells also can be adjacent. In any case, the two first cells can be shifted/offset by one cell with respect to the two second cells in the series circuit of the cells. The switching configuration of the switching apparatus further may be configured so that a switchover process causes the connection point of the first voltage supply connection and the connection point of the second voltage supply connection to be offset, preferably in sync, in the same direction along the series circuit of the cells. Since in the series circuit of the cells each pole of a cell is coupled to an opposite pole of the cells adjacent thereto, a switchover process causes the connection point of the first voltage supply connection and the connection point of the second voltage supply connection to be offset by one cell further in the series circuit of the cells. In particular, in both switching positions of the switching apparatus, the connection point of the first voltage supply connection of the first cell monitoring circuit and the connection point of the second voltage supply connection of the second cell monitoring circuit can be identical or can be at the same potential within the series circuit of the cells. The quantifiers "first" and "second" are numbered arbitrarily and are intended to denote at least two of a plurality of cell monitoring circuits that have a switchable voltage supply connection. Instead of two separate toggle switches, the switching apparatus can have a two-pole toggle switch.

The actuation of the switches of the switching apparatus, irrespective of their configuration, can be performed by the cell monitoring circuits themselves, which normally have a number of GPIO (general purpose input/output) contacts, by means of which the switches can be actuated. The cell monitoring circuits can also communicate among one another to effect synchronous switchover of the switches.

The first voltage supply connection of the first cell monitoring circuit and the second voltage supply connection of the second cell monitoring circuit can be coupled to one another and form a combined voltage supply connection of the two cell monitoring circuits. At the same time, the switching apparatus can then have a combined switch that is configured to couple the voltage supply connection to each one of two connection points, one of which is connected to one pole of one cell and the other is connected to the other pole (opposite pole) of the same cell. In this embodiment, the two switches are implemented as a combined switch. In this case, interactions between the two interconnected cell monitoring circuits may have to be taken into account.

A buffer capacitance can be coupled at each switchable voltage supply connection of a cell monitoring circuit. The buffer capacitance can be dimensioned so that the connection point of each of the switchable voltage supply connections can be switched over during operation of the cell monitoring circuit. As a result, the switchover of the connection points of the switchable voltage supply connections is possible at any time and not restricted only to points in time before start-up of the cell module, for instance at the point in time of the restart of the vehicle.

Each cell monitoring circuit can have plural measurement inputs each of which is coupled to at least one pole of a cell. Except for edge cells of the series circuit of the cells, each measurement input can be used to sample a potential at the pole and at the same time at the opposite pole of the adjacent cell. An activation switch can be arranged between one of the measurement inputs of each cell monitoring circuit, in which a voltage supply connection is designed to be switchable, and the corresponding connection point thereof to a pole of a cell. The activation switch can be a simple closing switch or single-pole on-switch. The activation switches can be switched in sync with the switching apparatus to take into account the circumstance that, due to the switching process of the switching apparatus, the number of cells monitored by a cell monitoring circuit (that is to say the number of cells between the connection points of the two voltage supply connections thereof) changes.

A battery also may be provided, such as a traction battery of a vehicle, such as an electric vehicle. The battery may have at least one cell module as described herein.

The invention also relates to a method for operating a cell module as described herein. The method includes switching over the switching apparatus to change a switching state of a respective one of the two voltage supply connections of at least two cell monitoring circuits with respect to the poles of the cells. As already explained, the change in switching state of the switchable voltage supply connections corresponds to a change in the connection points thereof to the series circuit of the cells.

The method can also include switching over the activation switch of those cell monitoring circuits in which the switching state of the voltage supply connections has been changed by the switching apparatus, preferably at the same time as the switching over of the switching apparatus. The switchover of the activation switches causes measurement inputs of the associated cell monitoring circuits to be activated or deactivated and thus the number thereof to be adjusted to the changed number of the cells that a cell monitoring circuit monitors after a successful switching process of the switching apparatus or that are assigned thereto for monitoring the cell voltage.

The method can be carried out for a traction battery of a vehicle and the switching over of the switching apparatus can take place cyclically upon each restart of the vehicle. The switchover can also take place in intervals, wherein it is attempted to keep the intervals of equal length as far as possible. To this end, at least one cell monitoring circuit or a separate module can record the time during which a switching state of the switching apparatus has been available. After reaching a threshold value, the correspondingly other switching state of the switching apparatus can be set immediately or only upon the next successful restart of the vehicle. As a result, even loading of the cells can be targeted despite possibly very non-homogeneous vehicle start-up times (for example a longer freeway journey followed by a number of shorter journeys).

The switching apparatus and the activation switches can be implemented as an energy-saving transistor circuit, for example based on MOSFETs.

Further advantages and refinements of the invention will emerge from the description and from the appended drawings.

It is understood that the features mentioned above and the features yet to be discussed below may be used in the respectively specified combination and also in other combinations or individually without departing from the scope of the invention.

DETAILED DESCRIPTION

Figure 1:
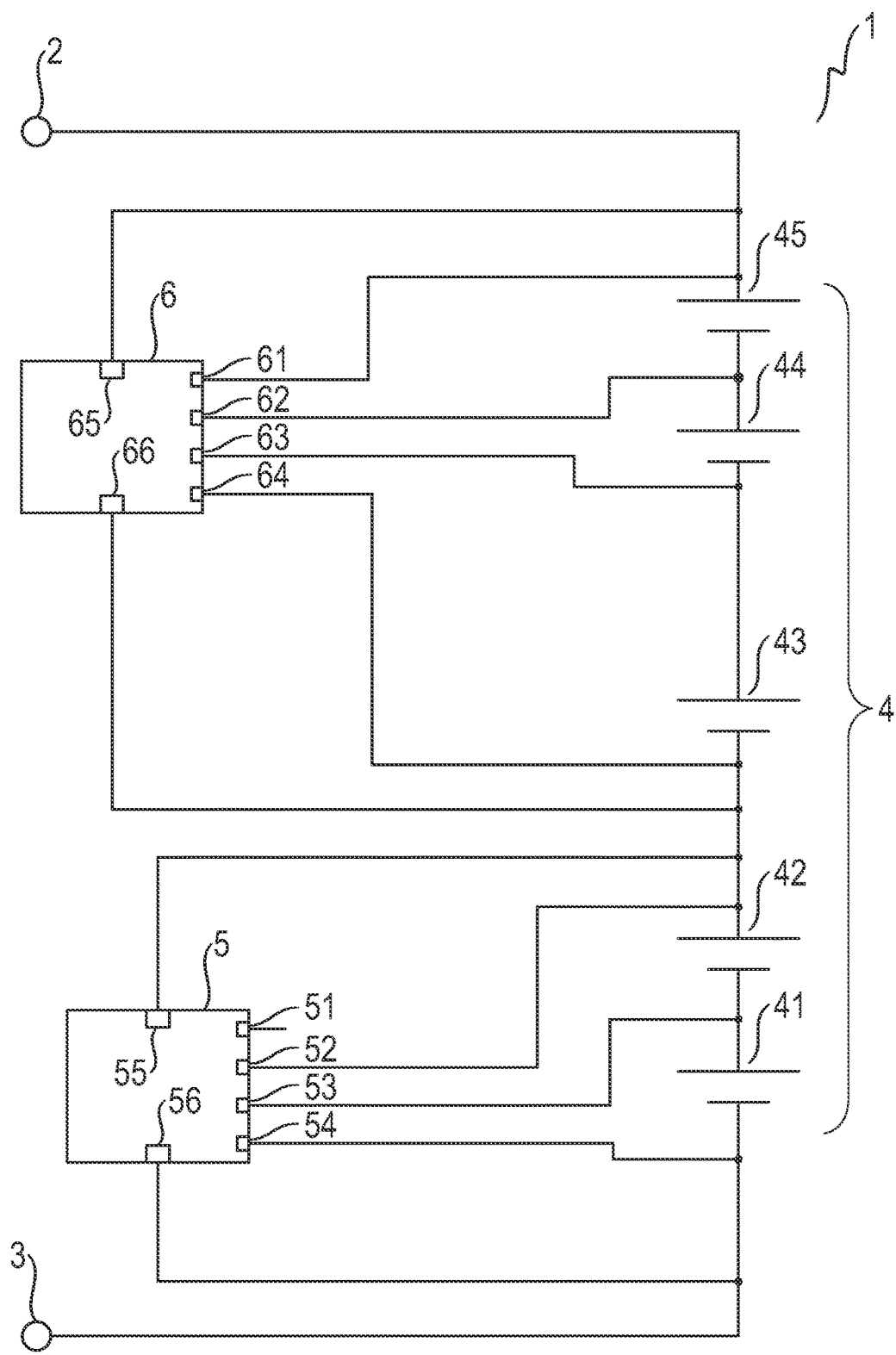
FIG. 1 shows a circuit diagram of a prior art cell module.

FIG. 1 shows a circuit diagram of a conventional cell module 1 from the prior art. A series circuit 4 of five cells 41-45, namely a first cell 41, a second cell 42, a third cell 43, a fourth cell 44 and a fifth cell 45 connected in series, is arranged between a first connection contact 2 and a second connection contact 3 of the cell module 1. Except for the first cell 41 and the fifth cell 45, which constitute edge cells or outer cells of the series circuit 4, the inner cells are coupled to one another by way of their opposite poles. A first cell monitoring circuit 5 and a second cell monitoring circuit 6 are provided to monitor the cell voltage of the cells 41-45. The first cell monitoring circuit 5 has four measurement inputs 51-54, of which the last three measurement inputs 52-54 are coupled to a respective pole of a cell. It should be considered here that for example the third measurement inputs 53 fulfils a double function since it is coupled both to the positive pole of the first cell 41 and to the negative pole 42 of the second cell 42. The first cell monitoring circuit 5 has a first voltage supply connection 55, which is coupled to the positive pole of the second cell 42, and a second voltage supply connection 56, which is coupled to the negative pole of the first cell 41. Therefore, the first two cells 41, 42 provide the operating voltage for the first cell monitoring circuit 5 and at the same time are assigned to the first cell monitoring circuit 5 for monitoring the cell voltage. Since the first cell monitoring circuit 5 is configured to determine the cell voltage of a total of three cells, one of the measurement inputs (in this case the first measurement input 51) is not used.

The second cell monitoring circuit 6 likewise has four measurement inputs 61-64 and is coupled to the series circuit 4 of the cells 61-64 in a manner analogous to the first cell monitoring circuit 5: the first voltage supply connection 65 of said second cell monitoring circuit is coupled to the positive pole of the fifth cell 45 and the second voltage supply connection 66 of said second cell monitoring circuit is coupled to the negative pole of the third cell 43. Therefore, the third, fourth and fifth cell 43-45 provide the operating voltage for the second cell monitoring circuit 6 and at the same time are assigned to the second cell monitoring circuit 6 for monitoring the cell voltage.

The scenario in FIG. 1 illustrates the case of uneven loading of the cells 41-45 that has already been discussed. Since the first cell monitoring circuit 5 is supplied only from two cells 41, 42 but the second cell monitoring circuit 6 is supplied from three cells 43-45, the first two cells 41, 42 are loaded to a greater extent overall than the other three cells 43-45. This leads to higher loading and therefore to premature aging of the first and second cell 41, 42.

Figure 2:
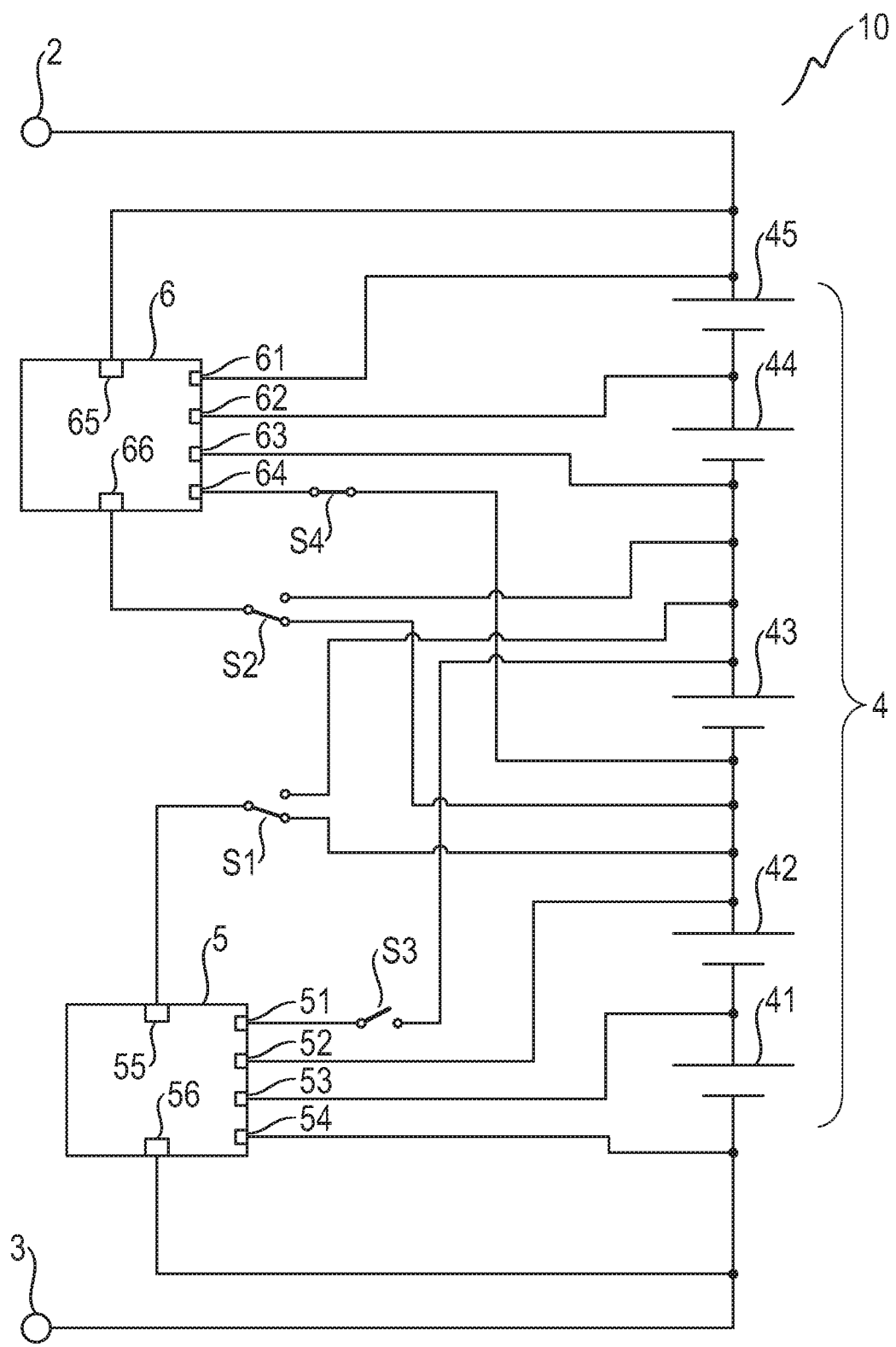
FIG. 2 shows a first switching state of a cell module according to an exemplary embodiment of the invention.

To prevent uneven loading, a cell module 10 with a circuitry construction according to FIG. 2 is provided. The cell module 10 according to the invention is modified with respect to the cell module 1 shown in FIG. 1 to the extent that a cyclic switchover of the voltage supply of the cell monitoring circuits 5, 6 is possible, with the result that the cells of a cell module undergo on average even loading. Since the construction of the cell module 10 according to the invention is similar in terms of essential features to the construction shown in FIG. 1, the same elements have been provided with the same reference signs and are not described again in detail.

The cell module 10 according to the invention has been expanded with respect to the cell module known from the prior art (FIG. 1) by means of four switches—a first switch S1, a second switch S2, a third switch S3 and a fourth switch S4—, wherein the first and the second switch S1, S2 form the switching apparatus defined above. The first voltage supply connection 55 of the first cell monitoring circuit 5 can be coupled selectively to the positive pole of the second cell 42 or to the positive pole of the third cell 43 by means of the first switch S1. Analogously thereto, the second voltage supply connection 66 of the second cell monitoring circuit 6 can be coupled selectively to the negative pole of the third cell 43 or to the negative pole of the fourth cell 44 by means of the second switch S2.

The switching position of the switches S1, S2 that is shown in FIG. 2 corresponds to a first switching state of the cell module 10 or to the switching apparatus and at the same time to the invariable state of the cell module 1 according to the prior art illustrated in FIG. 1. In addition, the third switch S3 and the fourth switch S4 are provided in the cell module 10 in order to deactivate unnecessary measurement inputs of the cell monitoring circuits 5, 6. In the first switching position, the third switch S3 is thus open since only the first two cells 41, 42 are assigned to the first cell monitoring circuit 5 and the third cell 43 is monitored not by the first but by the second cell monitoring circuit 6. The fourth switch S4 is therefore closed at the same time. The third and fourth switch S3, S4 do not have to be present as separate components but can also be integrated into the associated cell monitoring circuit 5, 6 or the functionality thereof can be integrated into the associated cell monitoring circuit 5, 6 by virtue of the corresponding measurement inputs being configured so as to be switchable.

Figure 3:
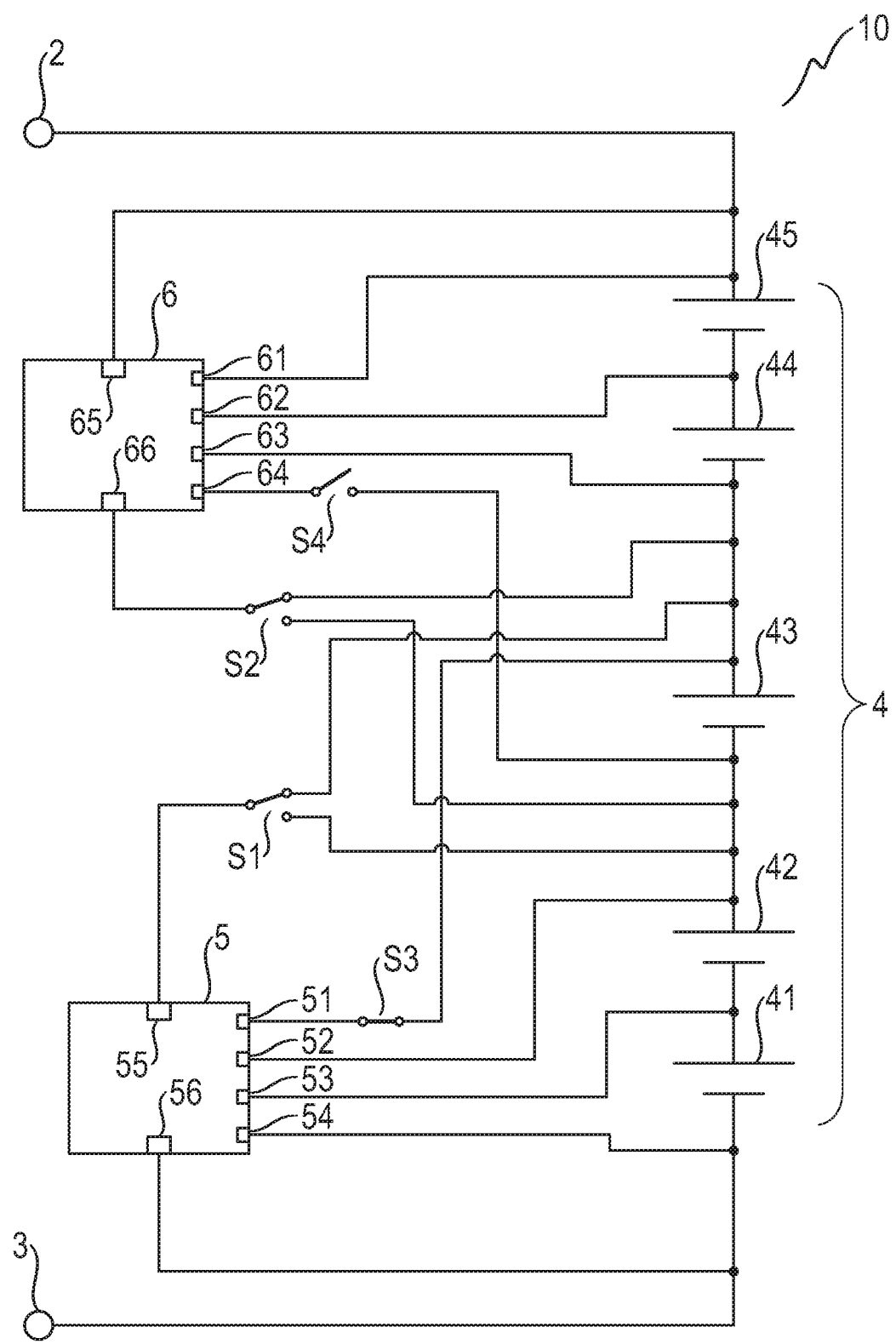
FIG. 3 shows a second switching state of a cell module according to an exemplary embodiment of the invention.

FIG. 3 shows a second switching position of the cell module 10 or of the switches, which proceeds from the first switching position shown in FIG. 2 by changing over the four switches S1-S4 and defines a second switching state of the cell module 10. The switchover of the four switches S1-S4 now causes the first voltage supply connection 55 of the first cell monitoring circuit 5 to be coupled to the positive pole of the third cell 43 and at the same time the second voltage supply connection 66 of the second cell monitoring circuit 6 to be coupled to the negative pole of the fourth cell 44. In addition, the third and fourth switch S3, S4 are switched over in order to switch the again necessary first measurement input 51 of the first cell monitoring circuit 5 to be operationally ready and to deactivate the unnecessary fourth measurement input 64 of the second cell monitoring circuit 6.

From the comparison of the two switching positions illustrated in FIGS. 2 and 3, it is clear that a switching process of the switching apparatus causes a cell—in this case the third cell 43—to be transferred so to speak from one cell monitoring circuit to another cell monitoring circuit, for example to a cell monitoring circuit that is provided for monitoring adjacent cells. In this case, the assignment of the cells to a cell monitoring circuit is defined by means of the position of the voltage supply connections thereof, wherein all of the cells that are arranged in the series circuit 4 of the cells 41-45 between the voltage supply connections of a cell monitoring circuit are considered as assigned thereto. In other words, a switchover of the switching apparatus causes the connection point of a voltage supply connection of a cell monitoring circuit and a connection point of a voltage supply connection of a further cell monitoring circuit with opposite polarity thereto to be transferred together in the same direction (that is to say for example along the potential drop or potential rise within the series circuit 4 of the cells) from their position between a cell pair to a position between a cell of said cell pair and a cell adjacent thereto.

Consequently, the switching apparatus is configured to cause an offset, in the same direction, of the connection points of opposite-pole voltage supply connections of two cell monitoring circuits that preferably monitor connected adjacent subgroups of cells in the series circuit 4. Through temporally compensated operation of the cell module 10 in both switching states, loading of the cells 41-45 that is on average balanced or even can be achieved by way of the ASICs. As a result, even aging of the cells can be achieved, which leads to an increase in the lifetime of the cell module and the degree of utilization of the cell modules. When the cell module according to the invention described here and the operating method associated therewith are used, the necessary balancing times can also be reduced since the construction is already configured for even loading of the cells. The mentioned advantages can be realized by way of a comparatively simple conversion of the known cell module topology when only a few additional elements are used.

What is claimed is:

1. A cell module for a traction battery of a vehicle, the cell module including:
    a plurality of cells, which are arranged in a series circuit;
    at least two cell monitoring circuits for identifying a voltage applied between two poles of each cell of the plurality of cells, wherein each cell monitoring circuit has two voltage supply connections, wherein a first voltage supply connection is coupled to a positive pole of a cell of the plurality of cells and a second voltage supply connection is coupled to a negative pole of another cell of the plurality of cells; and
    a switching apparatus configured to selectively couple the first voltage supply connection of a first cell monitoring circuit of said at least two cell monitoring circuits and the second voltage supply connection of a second cell monitoring circuit of said at least two cell monitoring circuits to a respective one of two positive poles or to a respective one of two negative poles of the plurality of cells.

2. The cell module of claim 1,
    wherein the switching apparatus has a first switch configured to couple the first voltage supply connection of the first cell monitoring circuit to a respective one of two positive poles of two first cells, and a second switch configured to couple the second voltage supply connection of the second cell monitoring circuit to a respective one of two negative poles of two second cells, wherein the two first cells are shifted by one cell with respect to the two second cells in the series circuit of the plurality of cells.

3. The cell module of claim 1, wherein
    the first voltage supply connection of the first cell monitoring circuit and the second voltage supply connection of the second cell monitoring circuit are coupled to one another and form a combined voltage supply connection; and
    the switching apparatus has a combined switch configured to couple the combined voltage supply connection to a respective one connection point of two connection points, of which one is connected to one pole of one cell of the plurality of cells and the other connection point is connected to the other pole of a same cell.

4. The cell module of claim 3,
    wherein a buffer capacitance is coupled to each switchable voltage supply connection of a cell monitoring circuit of said at least two cell monitoring circuits, the buffer capacitance being dimensioned in such a way that the connection point of said each switchable voltage supply connections can be switched over during operation of the cell monitoring circuit.

5. The cell module of claim 4, wherein
    each cell monitoring circuit has plural measurement inputs, each of which is coupled to at least one pole of a cell; and
    an activation switch is arranged between one measurement input of the plural measurement inputs of each cell monitoring circuit, in which a voltage supply connection is designed to be switchable, and a corresponding connected connection point thereof to a pole of a cell.

6. The cell module of claim 1,
    wherein a buffer capacitance is coupled to each switchable voltage supply connection of a cell monitoring circuit of said at least two cell monitoring circuits, the buffer capacitance being dimensioned in such a way that the connection point of said each switchable voltage supply connection can be switched over during operation of the cell monitoring circuit.

7. The cell module of claim 1, wherein
    each cell monitoring circuit of said at least two cell monitoring circuits has plural measurement inputs, each of which is coupled to at least one pole of a cell of said plurality of cells; and
    an activation switch is arranged between one measurement point of the plural measurement inputs of each cell monitoring circuit, in which a voltage supply connection is designed to be switchable, and a corresponding connected connection point thereof to a pole of a cell.

8. A traction battery of a vehicle that has the cell module of claim 1.

9. A method for operating the cell module of claim 1, comprising:
    switching over the switching apparatus to change a switching state of a respective one of the two voltage supply connections of at least two cell monitoring circuits with respect to the poles of the cells.

10. The method as claimed in claim 9, furthermore including:
    switching over activation switches of those cell monitoring circuits in which the switching state of the voltage supply connections has been changed by means of the switching apparatus, preferably at a same time as the switching over of the switching apparatus.

11. The method of claim 10, wherein
    a battery of the plurality of cells is a traction battery of a vehicle; and
    the switching over takes place cyclically upon each restart of the vehicle.

* * * * *